US011010742B2

(12) United States Patent
Boncimino

(10) Patent No.: US 11,010,742 B2
(45) Date of Patent: May 18, 2021

(54) SYSTEM, METHOD, AND COMPUTER PROGRAM PRODUCT FOR AUGMENTED REALITY POINT-OF-SALE

(71) Applicant: Visa International Service Association, San Francisco, CA (US)

(72) Inventor: Christopher Dennis Boncimino, Singapore (SG)

(73) Assignee: Visa International Service Association, San Francisco, CA (US)

( * ) Notice: Subject to any disclaimer, the term of this patent is extended or adjusted under 35 U.S.C. 154(b) by 197 days.

(21) Appl. No.: 16/254,652

(22) Filed: Jan. 23, 2019

(65) Prior Publication Data

US 2019/0228396 A1      Jul. 25, 2019

Related U.S. Application Data

(60) Provisional application No. 62/620,499, filed on Jan. 23, 2018.

(51) Int. Cl.
*G06Q 20/20* (2012.01)
*G06K 9/00* (2006.01)
*G06T 7/70* (2017.01)

(52) U.S. Cl.
CPC ....... *G06Q 20/203* (2013.01); *G06K 9/00671* (2013.01); *G06Q 20/201* (2013.01); *G06T 7/70* (2017.01); *G06T 2207/30244* (2013.01)

(58) Field of Classification Search
CPC .. G06Q 20/203; G06Q 20/201; G06Q 20/208; G06Q 20/20; G06K 9/00671;
(Continued)

(56) References Cited

U.S. PATENT DOCUMENTS 10,134,084 B1 * 11/2018 Gabriele ................. G06F 3/017
10,482,664 B1 * 11/2019 Schlosser .............. G06T 19/006
(Continued)

FOREIGN PATENT DOCUMENTS

KR      20120083612 A  *  7/2012
WO   WO-2015079431 A1  *  6/2015   ......... G06Q 20/3276

OTHER PUBLICATIONS

Z. Rashid, E. Peig and R. Pous, "Bringing online shopping experience to offline retail through augmented reality and RFID," 2015 5th International Conference on the Internet of Things (IOT), Seoul, 2015, pp. 45-51, doi: 10.1109/IOT.2015.7356547. (Year: 2015).*
(Continued)

*Primary Examiner* — Ashford S Hayles
(74) *Attorney, Agent, or Firm* — The Webb Law Firm

(57) ABSTRACT

Provided is a method for an augmented reality point-of-sale. A first location for rendering an augmented reality point-of-sale may be detected. A computer-generated image of the augmented reality point-of-sale may be superimposed on a view of the customer at the first location, which may be at least partially within the view of the customer. In response to an item being placed within the view of the customer, item data associated with the item may be detected. The item data may be transmitted to a merchant system. Price data associated with a price of the item may be received. A payment transaction may be initiated based on the price data. A system and a computer program product are also provided.

18 Claims, 8 Drawing Sheets

(58) Field of Classification Search
CPC ... G06T 2207/30244; G06T 7/70; G07G 1/01; G07F 9/023
See application file for complete search history.

(56) References Cited

U.S. PATENT DOCUMENTS

| | | | | |
|---|---|---|---|---|
| 2011/0187743 A1* | 8/2011 | Hwang | ............ | G06K 9/00671 345/633 |
| 2011/0320290 A1* | 12/2011 | Mehew | ............ | G06Q 40/04 705/16 |
| 2014/0192085 A1* | 7/2014 | Kim | ............ | G02B 27/017 345/633 |
| 2014/0211017 A1* | 7/2014 | Argue | ............ | G06Q 20/047 348/150 |
| 2014/0282162 A1* | 9/2014 | Fein | ............ | G06F 3/013 715/769 |
| 2015/0186984 A1* | 7/2015 | Loganathan | ............ | G06Q 30/0641 705/27.1 |
| 2015/0193115 A1* | 7/2015 | Chirakan | ............ | G06F 3/04842 715/810 |
| 2015/0309705 A1* | 10/2015 | Keeler | ............ | G06Q 30/0643 705/27.2 |
| 2017/0039613 A1* | 2/2017 | Kaehler | ............ | G02B 27/0172 |
| 2017/0364920 A1* | 12/2017 | Anand | ............ | H04L 63/0861 |
| 2018/0080774 A1* | 3/2018 | Sink | ............ | G06F 3/011 |
| 2018/0150831 A1* | 5/2018 | Dolan | ............ | G06Q 20/321 |
| 2018/0158060 A1* | 6/2018 | Adams | ............ | G06Q 20/3224 |
| 2019/0188672 A1* | 6/2019 | Charles | ............ | G07G 1/14 |

OTHER PUBLICATIONS

Authors et. al.: Disclosed Anonymously, "Method and Apparatus to Augment Store Associate Checkout with Consumer Scan Item Add," Jun. 4, 2012, An IP.com Prior Art Database Technical Disclosure (Year: 2012).*

N. Lobo, "Intelli-mirror: An augmented reality based IoT system for clothing and accessory display," 2016 International Conference on Internet of Things and Applications (IOTA), Pune, 2016, pp. 95-100, doi: 10.1109/IOTA.2016.7562702. (Year: 2016).*

A. Bodhani, "Getting a purchase on AR," in Engineering & Technology, vol. 8, No. 4, pp. 46-49, May 2013, doi: 10.1049/et.2013.0408. (Year: 2013).*

* cited by examiner

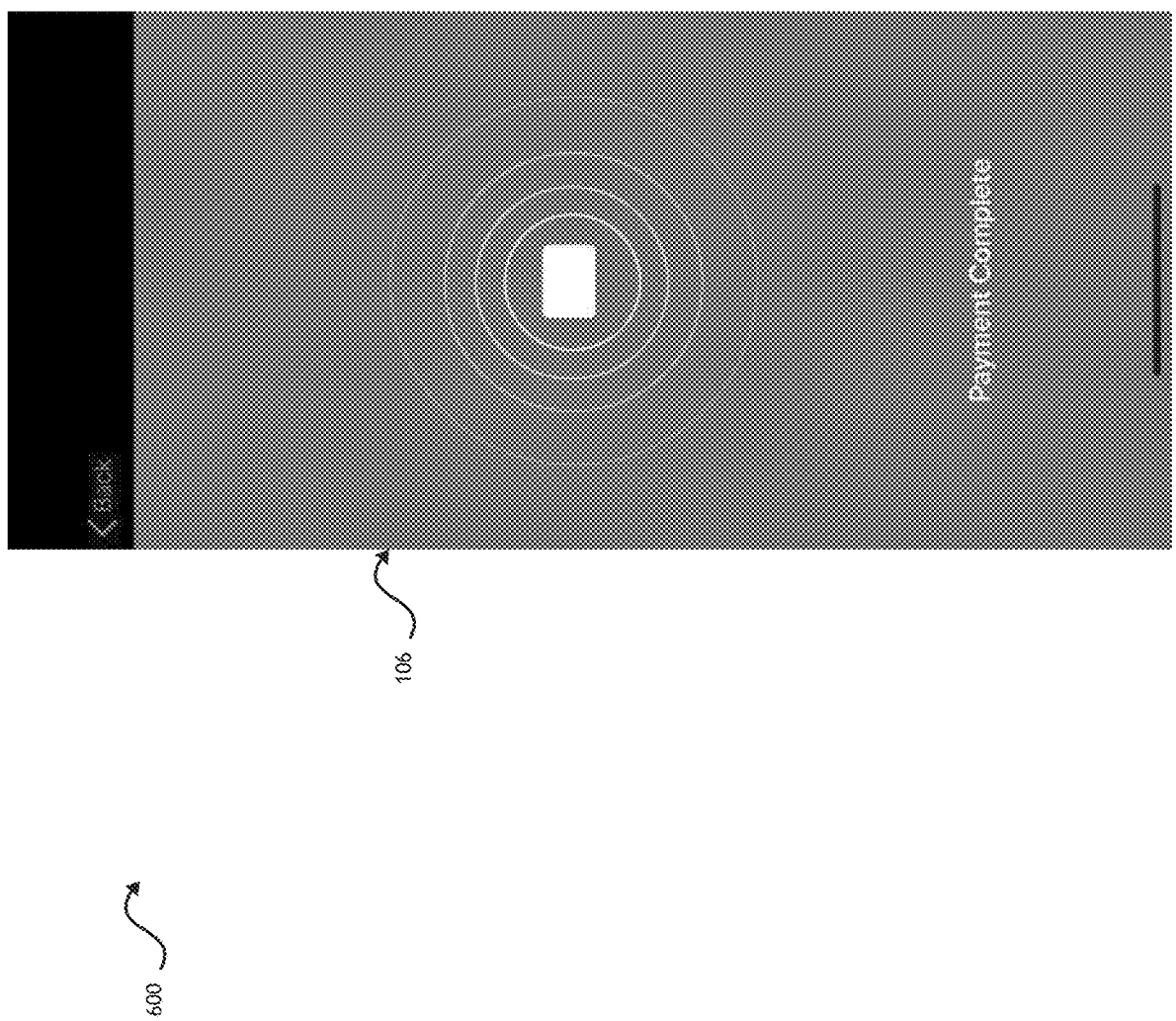

SYSTEM, METHOD, AND COMPUTER PROGRAM PRODUCT FOR AUGMENTED REALITY POINT-OF-SALE

CROSS-REFERENCE TO RELATED APPLICATIONS

This application claims priority to U.S. Provisional Patent Application No. 62/620,499, filed Jan. 23, 2018, the disclosure of which is hereby incorporated by reference in its entirety.

BACKGROUND OF THE INVENTION

1. Field of the Invention

This invention relates generally to applications for augmented reality and, in one particular embodiment, to a method, system, and computer program product for an augmented reality point-of-sale.

2. Technical Considerations

Conventional merchant locations may include physical point-of-sale (POS) devices deployed throughout the merchant location. For example, some merchant locations include an area for checkout aisles/counters at which a POS device (e.g., a cash register and/or card reader) is located for a staff member to use in assisting a customer in checkout (e.g., scan items, determine a total price, and/or collect payment). Additionally, some merchant locations may include self-checkout aisles/counters at which a customer directly uses a POS device to complete the checkout process, usually under the supervision of a staff member.

However, such POS devices may be expensive to purchase and maintain and may have to be updated or replaced from time to time. Additionally, a staff member is typically required to use or supervise the use of such POS devices. Accordingly, merchants may only use a limited number of POS devices at limited locations within each merchant location, which may result in congestion near and/or long lines at checkout aisles/counters within the merchant location and may also cause an inconvenience for customers who must carry items for purchase from remote areas within the merchant location to the checkout area.

SUMMARY OF THE INVENTION

Accordingly, it is an object of the presently disclosed subject matter to provide methods, systems, and computer program products for augmented reality, e.g., an augmented reality point-of-sale.

According to non-limiting embodiments, provided is a method for an augmented reality point-of-sale. In some non-limiting embodiments, a method for an augmented reality point-of-sale may include detecting a first location for rendering an augmented reality point-of-sale. A computer generated image of the augmented reality point-of-sale may be superimposed on a view of the customer at the first location, wherein the first location is at least partially within the view of the customer. In response to an item being placed within the view of the customer, item data associated with the item may be detected. The item data may be transmitted to a merchant system. Price data associated with a price of the item may be received. A payment transaction may be initiated based on the price data.

In some non-limiting embodiments, detecting the first location may include detecting a surface on which to render the augmented reality point-of-sale. Additionally or alternatively, the first location may be a predefined location within a merchant location, and detecting the first location may include detecting a position of the customer device and/or determining that the customer device is within the predetermined location. Additionally or alternatively, detecting the first location may include detecting a position of the customer device and/or determining that the customer device is not within a restricted location.

In some non-limiting embodiments, the customer device may include a camera and/or a display. Additionally or alternatively, the view of the customer may include an image captured by the camera and/or displayed on the display.

In some non-limiting embodiments, the computer-generated image of the augmented reality point-of-sale may indicate a second location to place the item for purchase. Additionally or alternatively, detecting the item data associated with the item may include detecting an optical code on the item. In some non-limiting embodiments, the optical code may represent the item data. In some non-limiting embodiments, the computer-generated image of the augmented reality point-of-sale may include an image of an optical scanner. Additionally or alternatively, the second location may be indicated by an image of an optical beam from the optical scanner.

In some non-limiting embodiments, initiating the payment transaction may include transmitting account data associated with an account identifier to the merchant system. Additionally or alternatively, initiating the payment transaction may include transmitting the account data associated with the account identifier and/or price data to a transaction handler.

In some non-limiting embodiments, an input from the customer may be detected before detecting the first location for rendering the augmented reality point-of-sale. In some non-limiting embodiments, in response to receiving the price data, the price of the item may be displayed on the computer-generated image of the augmented reality point-of-sale. In some non-limiting embodiments, an input from the customer may be detected before initiating the payment transaction.

In some non-limiting embodiments, authorization data, which may indicate that the payment transaction is complete, may be received. Additionally or alternatively, a message may be displayed on the computer generated image of the augmented reality point-of-sale. In some non-limiting embodiments, the message may indicate that the transaction is complete.

In some non-limiting embodiments, a request for assistance from a staff member associated with the merchant system may be transmitted.

In some non-limiting embodiments, a third location for rendering an augmented reality device may be detected with a merchant device associated with the merchant system. Additionally or alternatively, a computer-generated image of the augmented reality device may be superimposed on a view of a staff member associated with the merchant system at the third location. In some non-limiting embodiments, the third location may be at least partially within the view of the staff member. In some non-limiting embodiments, in response to completion of the payment transaction, a second message may be displayed on the computer-generated image of the augmented reality device. In some non-limiting embodiments, the message may indicate that the transaction is complete. Additionally or alternatively, the second message may further indicate the price of the item.

According to non-limiting embodiments, provided is a system for an augmented reality point-of-sale. In some non-limiting embodiments, the system for an augmented reality point-of-sale may include a merchant system at a merchant location and a customer device associated with a customer at the merchant location. The customer device may be in communication with the merchant system. The customer device may include a processor and a non-transitory computer readable medium comprising executable instructions to direct the processor to detect a first location within the merchant location for rendering an augmented reality point-of-sale. A computer-generated image of the augmented reality point-of-sale may be superimposed on a view of a customer at the first location. The first location may be at least partially within the view of the customer. In response to an item being placed within the view of the customer, item data associated with the item may be detected. The item data may be transmitted to a merchant system. Price data associated with a price of the item maybe received from the merchant system. A payment transaction may be initiated based on the price data.

In some non-limiting embodiments, the system may include a network in communication with the merchant system and the customer device. Additionally or alternatively, an acquirer system may be in communication with the network. Additionally or alternatively, a transaction service provider may be in communication with the network. Additionally or alternatively, an issuer system may be in communication with the network.

In some non-limiting embodiments, detecting the first location may include detecting (e.g., by the customer device) a surface on which to render the augmented reality point-of-sale. Additionally or alternatively, the first location may be a predefined location within a merchant location, and detecting the first location may include detecting a position of the customer device and/or determining that the customer device is within the predetermined location. Additionally or alternatively, detecting the first location may include detecting a position of the customer device and/or determining that the customer device is not within a restricted location.

In some non-limiting embodiments, the customer device may include a camera and/or a display. Additionally or alternatively, the view of the customer may include an image captured by the camera and/or displayed on the display.

In some non-limiting embodiments, the computer generated image of the augmented reality point-of-sale may indicate a second location to place the item for purchase. Additionally or alternatively, detecting the item data associated with the item may include detecting (e.g., by the customer device) an optical code on the item. In some non-limiting embodiments, the optical code may represent the item data. In some non-limiting embodiments, the computer-generated image of the augmented reality point-of-sale may include an image of an optical scanner. Additionally or alternatively, the second location may be indicated by an image of an optical beam from the optical scanner.

In some non-limiting embodiments, initiating the payment transaction may include transmitting (e.g., by the customer device) account data associated with an account identifier to the merchant system. Additionally or alternatively, initiating the payment transaction may include transmitting (e.g., by the customer device and/or the merchant system) the account data associated with the account identifier and/or price data to a transaction handler (e.g., via an acquirer system in an authorization request). Additionally or alternatively, the transaction handler may provide the account data and/or price data (and/or other data such as transaction amount data associated with a total transaction amount) to an issuer system (e.g. in an authorization request).

In some non-limiting embodiments, an input from the customer may be detected (e.g., by the customer device) before detecting the first location for rendering the augmented reality point-of-sale. In some non-limiting embodiments, in response to receiving the price data, the price of the item may be displayed (e.g., by the customer device) on the computer-generated image of the augmented reality point-of-sale. In some non-limiting embodiments, an input from the customer may be detected (e.g., on the customer device) before initiating the payment transaction.

In some non-limiting embodiments, authorization data, which may indicate that the payment transaction is complete, may be received (e.g., by the customer device). Additionally or alternatively, a message may be displayed on the computer-generated image of the augmented reality point-of-sale (e.g., by the customer device). In some non-limiting embodiments, the message may indicate that the transaction is complete.

In some non-limiting embodiments, a request for assistance from a staff member associated with the merchant system may be transmitted (e.g., by the customer device to the merchant system).

In some non-limiting embodiments, a third location for rendering an augmented reality device may be detected with a merchant device associated with the merchant system. Additionally or alternatively, a computer-generated image of the augmented reality device may be superimposed (e.g., by the merchant device) on a view of a staff member associated with the merchant system at the third location. In some non-limiting embodiments, the third location may be at least partially within the view of the staff member. In some non-limiting embodiments, in response to completion of the payment transaction, a second message may be displayed on the computer-generated image of the augmented reality device (e.g., by the merchant device). In some non-limiting embodiments, the message may indicate that the transaction is complete. Additionally or alternatively, the second message may further indicate the price of the item.

According to non-limiting embodiments, provided is a computer program product for an augmented reality point-of-sale. The computer program product may include at least one non-transitory computer-readable medium including one or more instructions that, when executed by at least one processor, cause the at least one processor to detect a first location for rendering an augmented reality point-of-sale. A computer-generated image of the augmented reality point-of-sale may be superimposed on a view of a customer at the first location, wherein the first location is at least partially within the view of the customer. In response to an item being placed within the view of the customer, item data associated with the item may be detected. The item data may be transmitted to a merchant system. Price data associated with a price of the item may be received. A payment transaction may be initiated based on the price data.

In some non-limiting embodiments, detecting the first location may include detecting a surface on which to render the augmented reality point-of-sale. Additionally or alternatively, the first location may be a predefined location within a merchant location, and detecting the first location may include detecting a position of the customer device and/or determining that the customer device is within the predetermined location. Additionally or alternatively, detecting the first location may include detecting a position of the customer device and/or determining that the customer device is not within a restricted location.

In some non-limiting embodiments, the customer device may include a camera and/or a display. Additionally or alternatively, the view of the customer may include an image captured by the camera and/or displayed on the display.

In some non-limiting embodiments, the computer-generated image of the augmented reality point-of-sale may indicate a second location to place the item for purchase. Additionally or alternatively, detecting the item data associated with the item may include detecting an optical code on the item. In some non-limiting embodiments, the optical code may represent the item data. In some non-limiting embodiments, the computer-generated image of the augmented reality point-of-sale may include an image of an optical scanner. Additionally or alternatively, the second location may be indicated by an image of an optical beam from the optical scanner.

In some non-limiting embodiments, initiating the payment transaction may include transmitting account data associated with an account identifier to the merchant system. Additionally or alternatively, initiating the payment transaction may include transmitting the account data associated with the account identifier and/or price data to a transaction handler.

In some non-limiting embodiments, an input from the customer may be detected before detecting the first location for rendering the augmented reality point-of-sale. In some non-limiting embodiments, in response to receiving the price data, the price of the item may be displayed on the computer-generated image of the augmented reality point-of-sale. In some non-limiting embodiments, an input from the customer may be detected before initiating the payment transaction.

In some non-limiting embodiments, authorization data, which may indicate that the payment transaction is complete, may be received. Additionally or alternatively, a message may be displayed on the computer generated image of the augmented reality point-of-sale. In some non-limiting embodiments, the message may indicate that the transaction is complete.

In some non-limiting embodiments, a request for assistance from a staff member associated with the merchant system may be transmitted.

In some non-limiting embodiments, a third location for rendering an augmented reality device may be detected with a merchant device associated with the merchant system. Additionally or alternatively, a computer-generated image of the augmented reality device may be superimposed on a view of a staff member associated with the merchant system at the third location. In some non-limiting embodiments, the third location may be at least partially within the view of the staff member. In some non-limiting embodiments, in response to completion of the payment transaction, a second message may be displayed on the computer-generated image of the augmented reality device. In some non-limiting embodiments, the message may indicate that the transaction is complete. Additionally or alternatively, the second message may further indicate the price of the item.

According to non-limiting embodiments, provided is a non-transitory computer readable medium for an augmented reality point of sale. In some non-limiting embodiments, the non-transitory computer readable medium may include executable instructions to direct a processor to perform the methods described herein.

Further embodiments are set forth in the following numbered clauses:

Clause 1: A method for an augmented reality point-of-sale, comprising: detecting, with at least one processor associated with a customer device of a customer, a first location for rendering an augmented reality point-of-sale; superimposing, with the at least one processor, a computer-generated image of the augmented reality point-of-sale on a view of the customer at the first location, wherein the first location is at least partially within the view of the customer; in response to an item being placed within the view of the customer, detecting, with the at least one processor, item data associated with the item; transmitting, with the at least one processor, the item data to a merchant system; receiving, with the at least one processor, price data associated with a price of the item; and initiating, with the at least one processor, a payment transaction based on the price data.

Clause 2: The method of clause 1, wherein detecting the first location comprises detecting a surface on which to render the augmented reality point-of-sale.

Clause 3: The method of clauses 1 or 2, wherein the first location is a predefined location within a merchant location, and wherein detecting the first location comprises: detecting, with the at least one processor, a position of the customer device; and determining, with the at least one processor, that the customer device is within the predetermined location.

Clause 4: The method of any preceding clause, wherein detecting the first location comprises: detecting, with the at least one processor, a position of the customer device; and determining, with the at least one processor, that the customer device is not within a restricted location.

Clause 5: The method of any preceding clause, wherein the customer device comprises a camera and a display, and further wherein the view of the customer comprises an image captured by the camera and displayed on the display.

Clause 6: The method of any preceding clause, wherein the computer-generated image of the augmented reality point-of-sale indicates a second location to place the item for purchase, and further wherein detecting the item data associated with the item comprises detecting an optical code on the item, the optical code representing the item data.

Clause 7: The method of any preceding clause, wherein the computer-generated image of the augmented reality point-of-sale comprises an image of an optical scanner, and wherein the second location is indicated by an image of an optical beam from the optical scanner.

Clause 8: The method of any preceding clause, wherein initiating the payment transaction comprises transmitting, with the at least one processor, account data associated with an account identifier to the merchant system.

Clause 9: The method of any preceding clause, wherein initiating the payment transaction comprises transmitting, with the at least one processor, account data associated with an account identifier and price data to a transaction handler.

Clause 10: The method of any preceding clause, further comprising detecting, with the at least one processor, an input from the customer before detecting the first location for rendering the augmented reality point-of-sale.

Clause 11: The method of any preceding clause, further comprising, in response to receiving the price data, displaying, with the at least one processor, the price of the item on the computer-generated image of the augmented reality point-of-sale.

Clause 12: The method of any preceding clause, further comprising detecting, with the at least one processor, an input from the customer before initiating the payment transaction.

Clause 13: The method of any preceding clause, further comprising: receiving, with the at least one processor, authorization data indicating that the payment transaction is complete; and displaying, with the at least one processor, a message on the computer-generated image of the augmented reality point-of-sale, wherein the message indicates that the transaction is complete.

Clause 14: The method of any preceding clause, further comprising, transmitting, with the at least one processor, a request for assistance from a staff member associated with the merchant system.

Clause 15: The method of any preceding clause, further comprising: detecting, with at least one second processor associated with a merchant device of the merchant system, a third location for rendering an augmented reality device; superimposing, with the at least one second processor, a computer-generated image of the augmented reality device on a view of a staff member associated with the merchant system at the third location, wherein the third location is at least partially within the view of the staff member; and in response to completion of the payment transaction, displaying, with the at least one second processor, a second message on the computer generated image of the augmented reality device, wherein the message indicates that the transaction is complete.

Clause 16: The method of any preceding clause, wherein the second message further indicates the price of the item.

Clause 17: A system for an augmented reality point-of-sale, comprising: a merchant system at a merchant location; a customer device associated with a customer at the merchant location, the customer device in communication with the merchant system, the customer device comprising a processor and a non-transitory computer readable medium comprising executable instructions to direct the processor to: detect a first location within the merchant location for rendering an augmented reality point-of-sale; superimpose a computer-generated image of the augmented reality point-of-sale on a view of a customer at the first location, wherein the first location is at least partially within the view of the customer; in response to an item being placed within the view of the customer, detect item data associated with the item; transmit the item data to a merchant system; receive price data associated with a price of the item; and initiate a payment transaction based on the price data.

Clause 18: The system of clause 17, further comprising: a network in communication with the merchant system and the customer device; an acquirer system in communication with the network; a transaction service provider in communication with the network; and an issuer system in communication with the network.

Clause 19: The system of clauses 17 or 18, wherein detecting the first location comprises detecting a surface on which to render the augmented reality point-of-sale.

Clause 20: The system of any one of clauses 17-19, wherein the first location is a predefined location within a merchant location, and wherein detecting the first location comprises: detecting, with the at least one processor, a position of the customer device; and determining, with the at least one processor, that the customer device is within the predetermined location.

Clause 21: The system of any one of clauses 17-20, wherein detecting the first location comprises: detecting, with the at least one processor, a position of the customer device; and determining, with the at least one processor, that the customer device is not within a restricted location.

Clause 22: The system of any one of clauses 17-21, wherein the customer device comprises a camera and a display, and further wherein the view of the customer comprises an image captured by the camera and displayed on the display.

Clause 23: The system of any one of clauses 17-22, wherein the computer-generated image of the augmented reality point-of-sale indicates a second location to place the item for purchase, and further wherein detecting the item data associated with the item comprises detecting an optical code on the item, the optical code representing the item data.

Clause 24: The system of any one of clauses 17-23, wherein the computer generated image of the augmented reality point-of-sale comprises an image of an optical scanner, and wherein the second location is indicated by an image of an optical beam from the optical scanner.

Clause 25: The system of any one of clauses 17-24, wherein initiating the payment transaction comprises transmitting, with the at least one processor, account data associated with an account identifier to the merchant system.

Clause 26: The system of any one of clauses 17-25, wherein initiating the payment transaction comprises transmitting, with the at least one processor, account data associated with an account identifier and price data to a transaction handler.

Clause 27: The system of any one of clauses 17-26, further comprising detecting, with the at least one processor, an input from the customer before detecting the first location for rendering the augmented reality point-of-sale.

Clause 28: The system of any one of clauses 17-27, further comprising, in response to receiving the price data, displaying, with the at least one processor, the price of the item on the computer-generated image of the augmented reality point-of-sale.

Clause 29: The system of any one of clauses 17-28, further comprising detecting, with the at least one processor, an input from the customer before initiating the payment transaction.

Clause 30: The system of any one of clauses 17-29, further comprising: receiving, with the at least one processor, authorization data indicating that the payment transaction is complete; and displaying, with the at least one processor, a message on the computer-generated image of the augmented reality point-of-sale, wherein the message indicates that the transaction is complete.

Clause 31: The system of any one of clauses 17-30, further comprising, transmitting, with the at least one processor, a request for assistance from a staff member associated with the merchant system.

Clause 32: The system of any one of clauses 17-31, further comprising: detecting, with at least one second processor associated with a merchant device associated with the merchant system, a third location for rendering an augmented reality device; superimposing, with the at least one second processor, a computer-generated image of the augmented reality device on a view of a staff member associated with the merchant system at the third location, wherein the third location is at least partially within the view of the staff member; and in response to completion of the payment transaction, displaying, with the at least one second processor, a second message on the computer-generated image of the augmented reality device, wherein the message indicates that the transaction is complete.

Clause 33: The system of any one of clauses 17-32, wherein the second message further indicates the price of the item.

Clause 34: A computer program product for an augmented reality point-of-sale, the computer program product comprising at least one non-transitory computer-readable medium including one or more instructions that, when executed by at least one processor, cause the at least one processor to: detect a first location for rendering an augmented reality point-of-sale; superimpose a computer-generated image of the augmented reality point-of-sale on a view of a customer at the first location, wherein the first location is at least partially within the view of the customer; in response to an item being placed within the view of the customer, detect item data associated with the item; transmit the item data to a merchant system; receive price data associated with a price of the item; and initiate a payment transaction based on the price data.

Clause 35: The computer program product of clause 34, wherein detecting the first location comprises detecting a surface on which to render the augmented reality point-of-sale.

Clause 36: The computer program product of clauses 34 or 35, wherein the first location is a predefined location within a merchant location, and wherein detecting the first location comprises: detecting, with the at least one processor, a position of the customer device; and determining, with the at least one processor, that the customer device is within the predetermined location.

Clause 37: The computer program product of any one of clauses 34-36, wherein detecting the first location comprises: detecting, with the at least one processor, a position of the customer device; and determining, with the at least one processor, that the customer device is not within a restricted location.

Clause 38: The computer program product of any one of clauses 34-37, wherein the customer device comprises a camera and a display, and further wherein the view of the customer comprises an image captured by the camera and displayed on the display.

Clause 39: The computer program product of any one of clauses 34-38, wherein the computer-generated image of the augmented reality point-of-sale indicates a second location to place the item for purchase, and further wherein detecting the item data associated with the item comprises detecting an optical code on the item, the optical code representing the item data.

Clause 40: The computer program product of any one of clauses 34-39, wherein the computer-generated image of the augmented reality point-of-sale comprises an image of an optical scanner, and wherein the second location is indicated by an image of an optical beam from the optical scanner.

Clause 41: The computer program product of any one of clauses 34-40, wherein initiating the payment transaction comprises transmitting, with the at least one processor, account data associated with an account identifier to the merchant system.

Clause 42: The computer program product of any one of clauses 34-41, wherein initiating the payment transaction comprises transmitting, with the at least one processor, account data associated with an account identifier and price data to a transaction handler.

Clause 43: The computer program product of any one of clauses 34-42, further comprising detecting, with the at least one processor, an input from the customer before detecting the first location for rendering the augmented reality point-of-sale.

Clause 44: The computer program product of any one of clauses 34-43, further comprising, in response to receiving the price data, displaying, with the at least one processor, the price of the item on the computer-generated image of the augmented reality point-of-sale.

Clause 45: The computer program product of any one of clauses 34-44, further comprising detecting, with the at least one processor, an input from the customer before initiating the payment transaction.

Clause 46: The computer program product of any one of clauses 34-45, further comprising: receiving, with the at least one processor, authorization data indicating that the payment transaction is complete; and displaying, with the at least one processor, a message on the computer-generated image of the augmented reality point-of-sale, wherein the message indicates that the transaction is complete.

Clause 47: The computer program product of any one of clauses 34-46, further comprising, transmitting, with the at least one processor, a request for assistance from a staff member associated with the merchant system.

Clause 48: The computer program product of any one of clauses 34-47, further comprising: detecting, with at least one second processor associated with a merchant device associated with the merchant system, a third location for rendering an augmented reality device; superimposing, with the at least one second processor, a computer-generated image of the augmented reality device on a view of a staff member associated with the merchant system at the third location, wherein the third location is at least partially within the view of the staff member; and in response to completion of the payment transaction, displaying, with the at least one second processor, a second message on the computer-generated image of the augmented reality device, wherein the message indicates that the transaction is complete.

Clause 49: The computer program product of any one of clauses 34-48, wherein the second message further indicates the price of the item.

The features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a," "an," and "the" include plural referents unless the context clearly dictates otherwise.

BRIEF DESCRIPTION OF THE DRAWINGS

Additional advantages and details of the invention are explained in greater detail below with reference to the exemplary embodiments that are illustrated in the accompanying schematic figures, in which:

FIGS. 6A-6C are images of a non-limiting embodiment of an implementation of a non-limiting embodiment of the process shown in FIG. 3.

DESCRIPTION OF THE INVENTION

Figure 1:
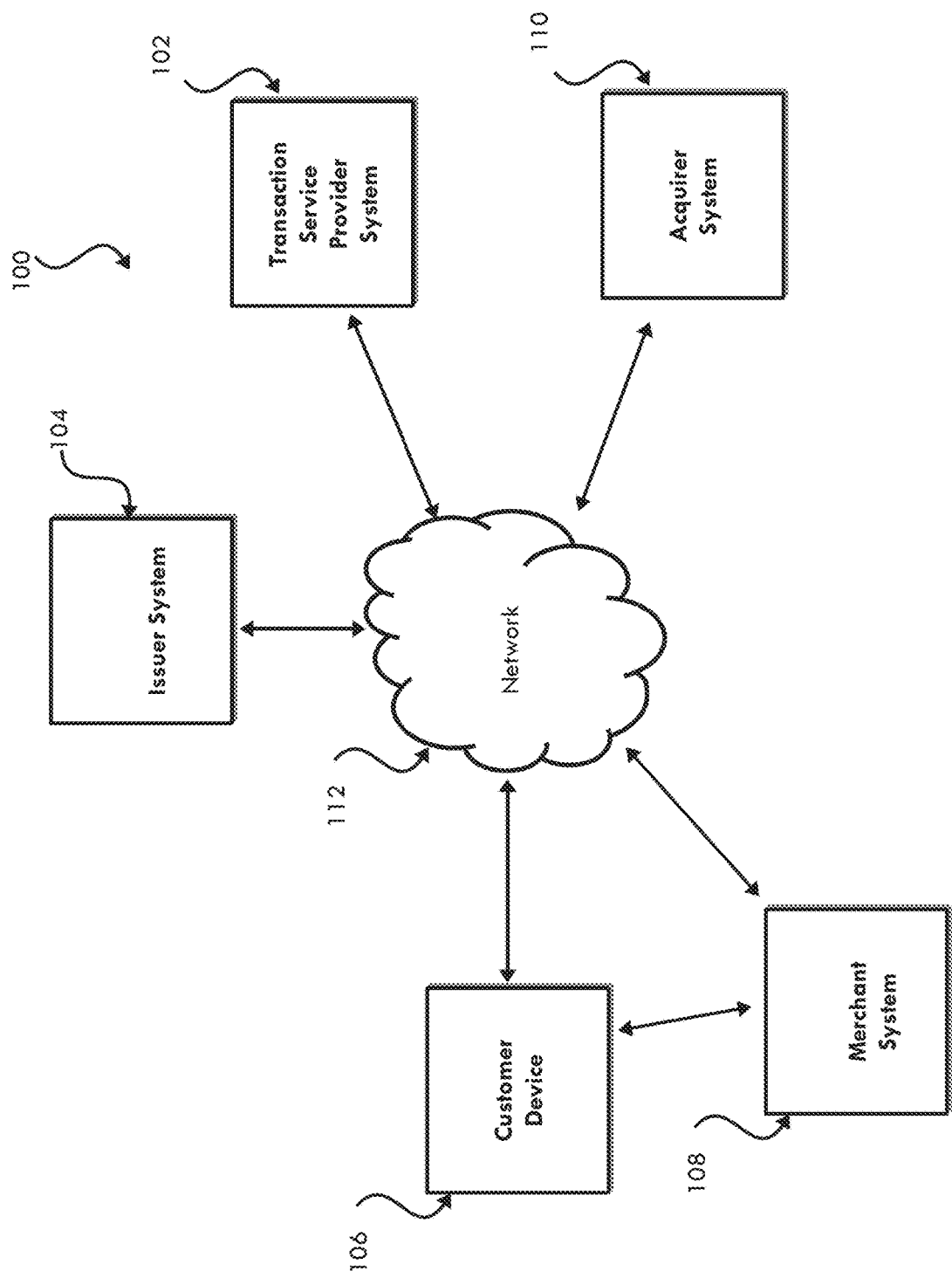
FIG. 1 is a diagram of a non-limiting embodiment of an environment in which systems, apparatuses, and/or methods, as described herein, may be implemented.

For purposes of the description hereinafter, the terms "end," "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least in partially on" unless explicitly stated otherwise.

As used herein, the terms "communication" and "communicate" may refer to the reception, receipt, transmission, transfer, provision, and/or the like, of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet, and/or the like) that includes data. It will be appreciated that numerous other arrangements are possible.

As used herein, the terms "issuer institution," "portable financial device issuer," "issuer," or "issuer bank" may refer to one or more entities that provide accounts to customers for conducting transactions (e.g., payment transactions), such as initiating credit and/or debit payments. For example, an issuer institution may provide an account identifier, such as a personal account number (PAN), to a customer that uniquely identifies one or more accounts associated with that customer. The account identifier may be embodied on a portable financial device, such as a physical financial instrument (e.g., a payment card), and/or may be electronic and used for electronic payments. In some non-limiting embodiments, an issuer institution may be associated with a bank identification number (BIN) that uniquely identifies the issuer institution. As used herein "issuer institution system" may refer to one or more computer systems operated by or on behalf of an issuer institution, such as a server executing one or more software applications. For example, an issuer institution system may include one or more authorization servers for authorizing a transaction.

As used herein, the term "account identifier" may refer to one or more types of identifiers associated with a user account (e.g., an account identifier, a PAN, a card number, a payment card number, a token, and/or the like). In some non-limiting embodiments, an issuer institution may provide an account identifier (e.g., a PAN, a token, and/or the like) to a user that uniquely identifies one or more accounts associated with that user. The account identifier may be embodied on a physical financial instrument (e.g., a portable financial instrument, a payment card, a credit card, a debit card, and/or the like) and/or may be electronic information communicated to the user that the user may use for electronic payments. In some non-limiting embodiments, the account identifier may be an original account identifier, where the original account identifier was provided to a user at the creation of the account associated with the account identifier. In some non-limiting embodiments, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In some non-limiting embodiments, an account identifier may be directly or indirectly associated with an issuer institution such that an account identifier may be a token that maps to a PAN or other type of identifier. Account identifiers may be alphanumeric, any combination of characters and/or symbols, and/or the like.

As used herein, the term "token" may refer to an identifier that is used as a substitute or replacement identifier for an account identifier, such as a PAN. A token may be used as a substitute or replacement identifier for an original account identifier, such as a PAN. Tokens may be associated with a PAN or other original account identifiers in one or more data structures (e.g., one or more databases, and/or the like) such that they may be used to conduct a transaction without directly using the original account identifier. In some non-limiting embodiments, an original account identifier, such as a PAN, may be associated with a plurality of tokens for different individuals or purposes. In some non-limiting embodiments, tokens may be associated with a PAN or other account identifiers in one or more data structures such that they may be used to conduct a transaction without directly using the account identifier, such as a PAN. In some examples, an account identifier, such as a PAN, may be associated with a plurality of tokens for different uses or different purposes.

As used herein, the term "merchant" may refer to one or more entities (e.g., operators of retail businesses) that provide goods and/or services, and/or access to goods and/or services, to a user (e.g., a customer, a consumer, and/or the like) based on a transaction, such as a payment transaction. As used herein "merchant system" may refer to one or more computer systems operated by or on behalf of a merchant, such as a server executing one or more software applications. As used herein, the term "product" may refer to one or more goods and/or services offered by a merchant.

As used herein, a "point-of-sale (POS) device" may refer to one or more devices, which may be used by a merchant to conduct a transaction (e.g., a payment transaction) and/or process a transaction. For example, a POS device may include one or more computers, peripheral devices, card readers, near-field communication (NFC) receivers, radio frequency identification (RFID) receivers, and/or other contactless transceivers or receivers, contact-based receivers, payment terminals, computers, servers, input devices, and/or the like.

As used herein, a "point-of-sale (POS) system" may refer to one or more computers and/or peripheral devices used by a merchant to conduct a transaction. For example, a POS system may include one or more POS devices and/or other like devices that may be used to conduct a payment transaction. A POS system (e.g., a merchant POS system) may also include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa®, MasterCard®, American Express®, or any other entity that processes transactions. As used herein "transaction service provider system" may refer to one or more computer systems operated by or on behalf of a transaction service provider, such as a transaction service provider system executing one or more software applications. A transaction service provider system may include one or more processors and, in some non-limiting embodiments, may be operated by or on behalf of a transaction service provider.

As used herein, the term "acquirer" may refer to an entity licensed by the transaction service provider and approved by the transaction service provider to originate transactions (e.g., payment transactions) using a portable financial device associated with the transaction service provider. As used herein, the term "acquirer system" may also refer to one or more computer systems, computer devices, and/or the like operated by or on behalf of an acquirer. The transactions the acquirer may originate may include payment transactions (e.g., purchases, original credit transactions (OCTs), account funding transactions (AFTs), and/or the like). In some non-limiting embodiments, the acquirer may be authorized by the transaction service provider to assign merchant or service providers to originate transactions using a portable financial device of the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure that proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by an acquirer's payment facilitators, and/or the like. In some non-limiting embodiments, an acquirer may be a financial institution, such as a bank.

As used herein, the term "portable financial device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet application, a personal digital assistant (PDA), a pager, a security card, a computer, an access card, a wireless terminal, and/or a transponder, as examples. The portable financial device may include a volatile or a non-volatile memory to store information (e.g., an account identifier, a name of the account holder, and/or the like).

As used herein, the terms "client" and "client device" may refer to one or more client-side devices or systems, remote from a transaction service provider, used to initiate or facilitate a transaction. As an example, a "client device" may refer to one or more POS devices and/or POS systems used by a merchant. It will be appreciated that a client device may be any electronic device configured to communicate with one or more networks and initiate or facilitate transactions such as, but not limited to, one or more computers, portable computers, tablet computers, cellular phones, wearable devices (e.g., watches, glasses, lenses, clothing, and/or the like), PDAs, and/or other like devices. Moreover, a "client" may also refer to an entity, such as a merchant, that owns, utilizes, and/or operates a client device for initiating transactions with a transaction service provider.

As used herein, the term "server" may refer to one or more computing devices, such as processors, storage devices, and/or similar computer components that communicate with client devices and/or other computing devices over a network, such as the Internet or private networks, and, in some examples, facilitate communication among other servers and/or client devices. It will be appreciated that various other arrangements are possible. As used herein, the term "system" may refer to one or more computing devices or combinations of computing devices, such as but not limited to processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or a different server and/or a processor recited as performing a second step or function.

Non-limiting embodiments of the present invention are directed to systems, methods, and computer program products for an augmented reality point-of-sale (AR POS). Non-limiting embodiments of the invention allow for an AR POS to be superimposed on a view of a customer using a customer device. In this way, the customer may interact with the AR POS to complete a checkout process (e.g., scan items for purchase and complete a payment transaction, as further described herein) at a convenient location within a merchant location without the need for any physical POS device. Accordingly, the present invention provides the advantages of improving customer experience because a customer is not limited to checkout at a limited number of physical POS devices at checkout aisles/counters that may be inconveniently located but instead may checkout anywhere within a merchant location (or at any convenient area designated for checkout, as described herein). Additionally, congestion near and/or long lines at checkout aisles/counters within the merchant location may be reduced because customers will not be congregating thereat but instead able to checkout anywhere within a merchant location (or at any convenient area designated for checkout, as described herein). Moreover, the present invention provides the advantage of allowing a merchant to have unlimited (or at least increased) capacity for checking out customers without requiring expenditures to acquire additional physical POS devices and/or to hire additional staff members to use/supervise such POS devices because each customer will be able to complete the checkout process using an AR POS conveniently via a customer device.

Referring now to FIG. 1, FIG. 1 is a diagram of an example environment 100 in which devices, systems, and/or methods, described herein, may be implemented. As shown in FIG. 1, environment 100 includes a transaction service provider system 102, an issuer system 104, a customer device 106, a merchant system 108, an acquirer system 110, and a network 112.

Transaction service provider system 102 may include one or more devices capable of receiving information from and/or communicating information to issuer system 104, customer device 106, merchant system 108, and/or acquirer system 110 via network 112. For example, transaction service provider system 102 may include a computing device, such as a server (e.g., a transaction processing server), a group of servers, and/or other like devices. In some non-limiting embodiments, transaction service provider system 102 may be associated with transaction service provider as described herein. In some non-limiting embodiments, transaction service provider system 102 may be in communication with a data storage device, which may be local or remote to the transaction service provider system 102. In some non-limiting embodiments, transaction service provider system 102 may be capable of receiving information from, storing information in, communicating information to, or searching information stored in data storage device.

Issuer system 104 may include one or more devices capable of receiving information and/or communicating information to transaction service provider system 102, customer device 106, merchant system 108, and/or acquirer system 110 via network 112. For example, issuer system 104 may include a computing device, such as a server, a group of servers, and/or other like devices. In some non-limiting embodiments, issuer system 104 may be associated with an issuer institution as described herein. For example, issuer system 104 may be associated with an issuer institution that issued a credit account, debit account, credit card, debit card, and/or the like to a user associated with customer device 106.

Customer device 106 may include one or more devices capable of receiving information from and/or communicating information to transaction service provider system 102, issuer system 104, merchant system 108, and/or acquirer system 110 via network 112. For example, customer device 106 may include a client device and/or the like. In some non-limiting embodiments, customer device 106 may or may not be capable of receiving information (e.g., from merchant system 108) via a short range wireless communication connection (e.g., an NFC communication connection, an RFID communication connection, a Bluetooth® communication connection, and/or the like), and/or communicating information (e.g., to merchant system 108) via a short range wireless communication connection.

Merchant system 108 may include one or more devices capable of receiving information from and/or communicating information to transaction service provider system 102, issuer system 104, customer device 106, and/or acquirer system 110 via network 112. Merchant system 108 may also include a device capable of receiving information from customer device 106 via network 112, a communication connection (e.g., an NFC communication connection, an RFID communication connection, a Bluetooth® communication connection, and/or the like) with customer device 106, and/or the like, and/or communicating information to customer device 106 via network 112, the communication connection, and/or the like. In some non-limiting embodiments, merchant system 108 may include a computing device, such as a server, a group of servers, a client device, a group of client devices, and/or other like devices. In some non-limiting embodiments, merchant system 108 may be associated with a merchant as described herein. In some non-limiting embodiments, merchant system 108 may include one or more client devices. For example, merchant system 108 may include a client device that allows a merchant to communicate information to transaction service provider system 102. In some non-limiting embodiments, merchant system 108 may include one or more devices, such as computers, computer systems, and/or peripheral devices capable of being used by a merchant to conduct a transaction with a user. For example, merchant system 108 may include a POS device and/or a POS system.

Acquirer system 110 may include one or more devices capable of receiving information from and/or communicating information to transaction service provider system 102, issuer system 104, customer device 106, and/or merchant system 108 via network 112. For example, acquirer system 110 may include a computing device, a server, a group of servers, and/or the like. In some non-limiting embodiments, acquirer system 110 may be associated with an acquirer as described herein.

Network 112 may include one or more wired and/or wireless networks. For example, network 112 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 1 are provided as an example. There may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
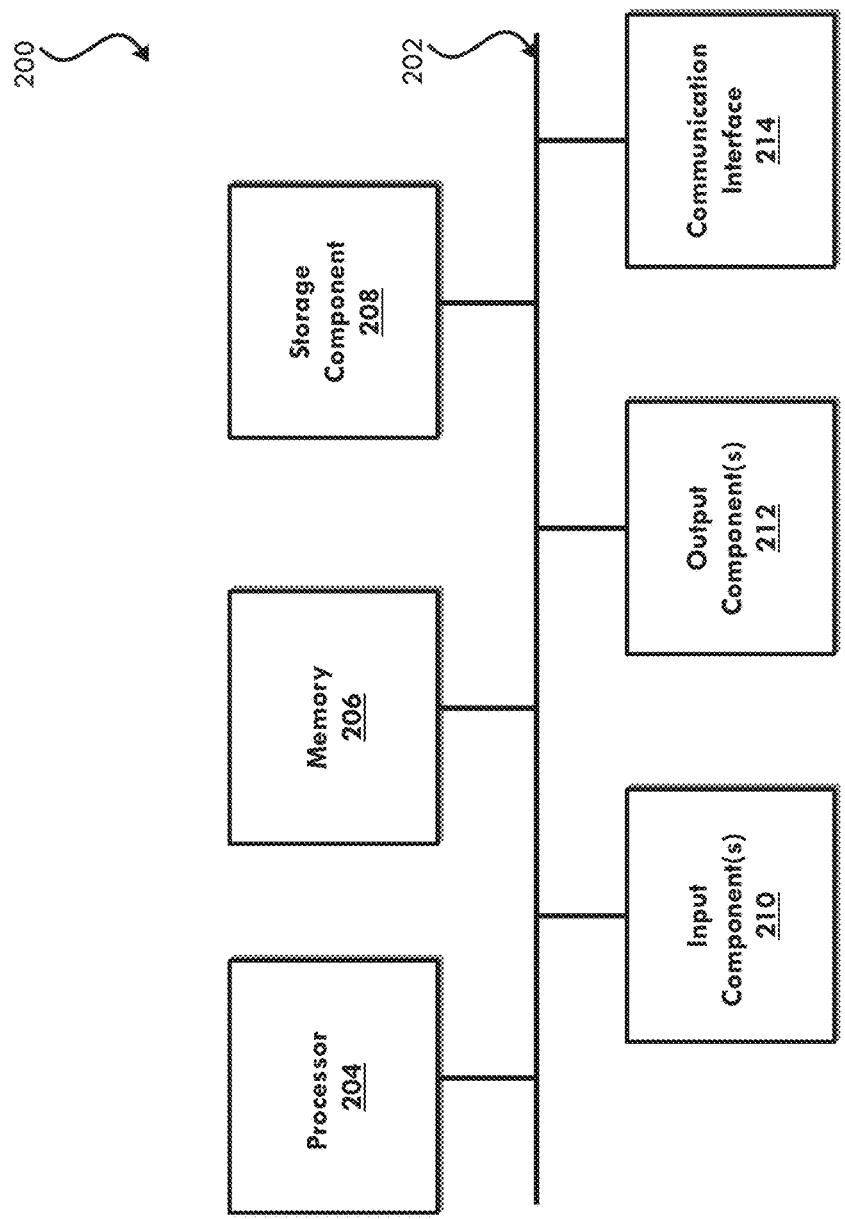
FIG. 2 is a diagram of a non-limiting embodiment of components of one or more devices of FIG. 1.

Referring now to FIG. 2, FIG. 2 is a diagram of example components of a device 200. Device 200 may correspond to one or more devices of transaction service provider system 102, and/or one or more devices of issuer system 104, customer device 106, one or more devices of merchant system 108, and/or one or more devices of acquirer system 110. In some non-limiting embodiments, transaction service provider system 102, issuer system 104, customer device 106, merchant system 108, and/or acquirer system 110 may include at least one device 200 and/or at least one component of device 200. As shown in FIG. 2, device 200 may include a bus 202, a processor 204, memory 206, a storage component 208, an input component 210, an output component 212, and a communication interface 214.

Bus 202 may include a component that permits communication among the components of device 200. In some non-limiting embodiments, processor 204 may be implemented in hardware, firmware, software, or any combination thereof. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that may be programmed to perform a function. Memory 206 may include random access memory (RAM), read only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally, or alternatively, input component 210 may include a sensor for sensing information (e.g., a global positioning system (GPS) component, an accelerometer, a gyroscope, an actuator, etc.) and/or a camera for capturing images (e.g., of the view of a user such as a customer or a staff member of a merchant). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 2 are provided as an example. In some non-limiting embodiments, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3:
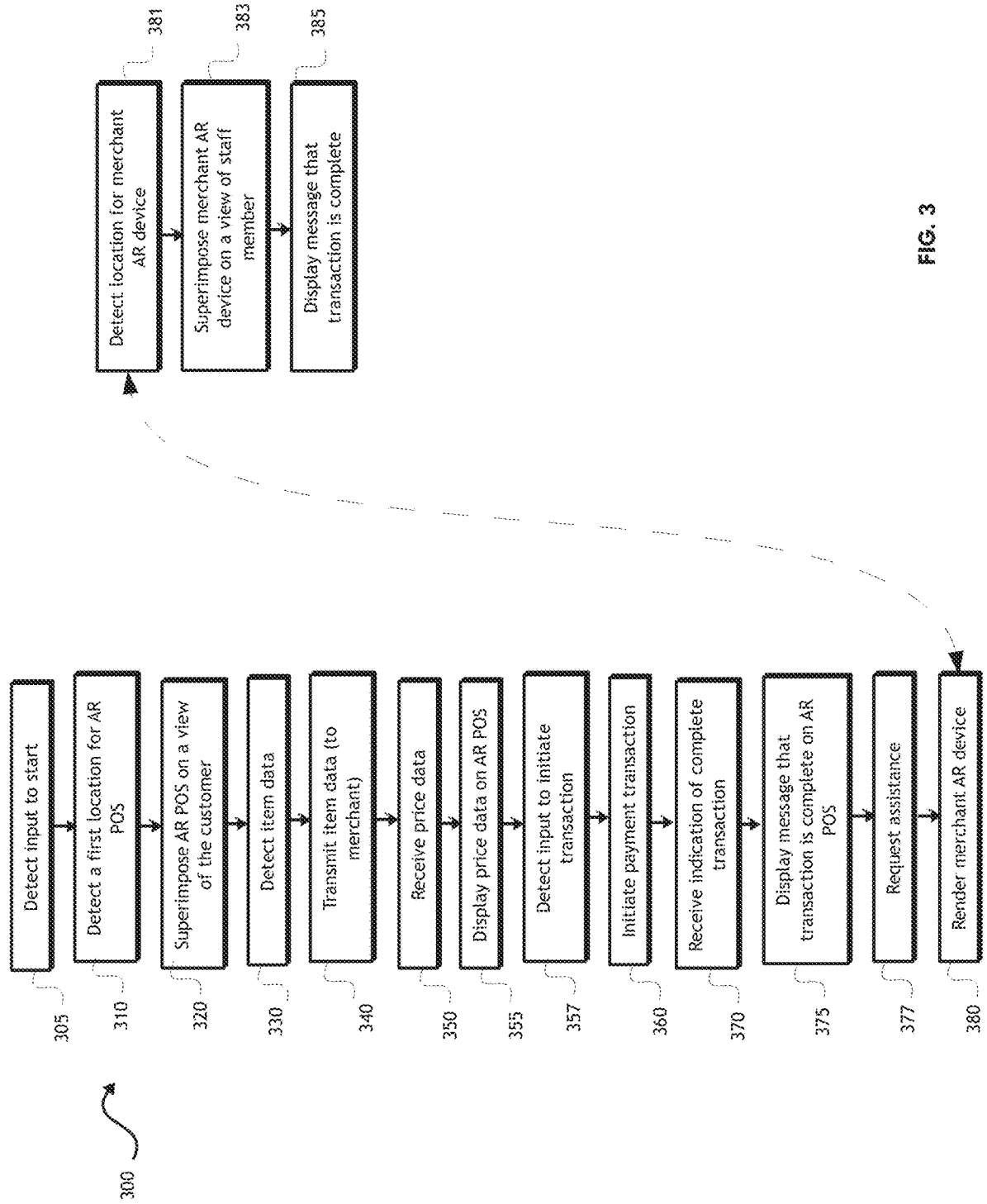
FIG. 3 is a flowchart illustrating a non-limiting embodiment of a method for an augmented reality point-of-sale.
Figure 4:
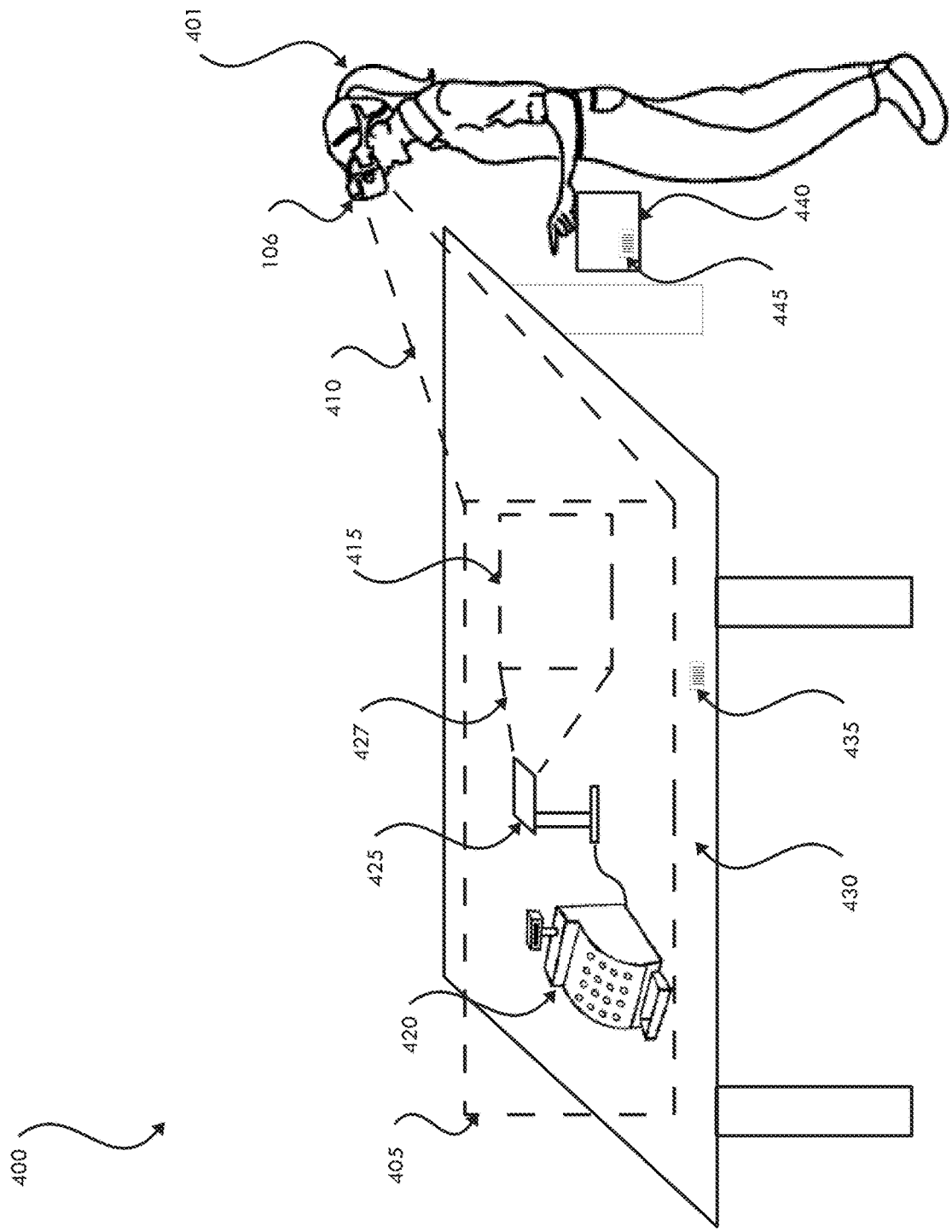
FIG. 4 is a diagram of a non-limiting embodiment of a system for an augmented reality point-of-sale.

Referring now to FIG. 4, FIG. 4 is a diagram of a non-limiting embodiment of a system 400 for an AR POS. System 400 may be implemented within the environment of FIG. 1 and may include customer device 106 and/or one or more devices of transaction service provider system 102, one or more devices of issuer system 104, one or more devices of merchant system 108, and/or one or more devices of acquirer system 110. As shown in FIG. 4, system 400 may include customer device 106, which, for example, may be in communication with at least one network 112 and/or with at least one device of merchant system 108, as described herein. Additionally, the customer device 106 may render an AR POS 420, as described herein. Further details regarding the system 400 are discussed below in connection with FIG. 3.

Referring now to FIG. 3, and with continued reference to FIGS. 1-2 and 4, FIG. 3 is a flowchart of a non-limiting embodiment of a process 300 for an AR POS. In some non-limiting embodiments, one or more of the steps of process 300 may be performed (e.g., completely, partially, etc.) by customer device 106. In some non-limiting embodiments, one or more of the steps of process 300 may be performed (e.g., completely, partially, etc.) by another device or a group of devices separate from or including customer device 106, such as transaction service provider system 102 (e.g., one or more devices of transaction service provider system 102), issuer system 104 (e.g., one or more devices of issuer system 104), merchant system 108 (e.g., one or more devices of merchant system 108), or acquirer system 110 (e.g., one or more devices of acquirer system 110).

As shown in FIG. 3, at step 305, in some non-limiting embodiments, process 300 may include detecting an input to start/begin. For example, a customer 401 may provide input to customer device 106 by directing or gesturing the customer device to start/begin via input component(s) 210. For purpose of illustration, input component(s) 210 may include a camera and customer device 106 may be configured to detect and interpret one or more gestures from customer 401. Additionally or alternatively, customer device 106 may be capable of interpreting haptic input provided by customer 401 via touch sensors or motion sensors. Additionally or alternatively, customer device 106 may receive input via any input component(s) 210 described herein. Alternatively, the process 300 may start/begin automatically without input from customer 401. For example, the process 300 may start automatically based on detecting a location for rendering an AR POS 420, as described herein.

As further shown in FIG. 3, at step 310, process 300 includes detecting a first location 405 for rendering an AR POS 420. For example, customer device 106 may detect first location 405.

In some non-limiting embodiments, customer device 106 may detect a surface 430 on which to render AR POS 420. For example, surface 430 may be any flat surface suitably large for AR POS 420 to be rendered thereon (e.g., at least as wide and as deep as the computer-generated image of AR POS 420 will appear). Additionally or alternatively, surface 430 may be identifiable by customer device 106 as a surface designated for AR POS 420. For purpose of illustration, surface 430 may be a portion of an object that can be identified by customer device 106. For example, surface 430 may be a top surface of a table of which an image may be obtained by a camera of customer device 106 and which customer device 106 may identify (e.g., based on object recognition software and/or the like). Additionally or alternatively, surface 430 may have a marking and/or an optical code 435 that can be identified by the customer device 106. For example, customer device 106 may capture an image of the marking and/or optical code 435 to be identified (e.g., based on optical code recognition software and/or the like). Optical code 435 may be any suitable code, including a barcode (e.g., a one-dimensional or two-dimensional bar code and/or the like), a quick response (QR) code, and/or the like.

In some non-limiting embodiments, first location 405 may be a predefined location within the merchant location. For the purpose of illustration, a position of customer device 106 can be detected by any suitable means. For example, the location of customer device 106 may be detected using any suitable means, including but not limited to GPS, triangulation, indoor mapping, and/or the like. Based on the detected position, customer device 106 can determine whether it is within the predetermined location. Additionally or alternatively, the predetermined locations may be limited to areas proximate to staff members, security personnel, and/or security devices, and/or limited to areas proximate to materials helpful for checkout, e.g., bags, bagging stations, countertops, conveyors, and/or the like.

In some non-limiting embodiments, first location 405 can be any location that is not a restricted location. For example, customer device 106 may detect its position within the merchant location, as described herein. Restricted locations may be predetermined areas of the merchant location, and customer device 106 may detect whether it is in a predetermined restricted location based on its detected position. Additionally or alternatively, customer device 106 may be configured (e.g., by suitable object recognition software and/or the like) to detect it is in a restricted location based on input from one or more input component(s) 210. For example, input component(s) 210 may include a camera, and customer device 106 may be configured to capture an image at its current position and detect from the image whether it is within a restricted location (e.g., a hallway, an aisle, an elevator, a staircase, and escalator, a doorway or other point in ingress/egress, and/or the like). If customer device 106 determines that it is not within a restricted location, customer device 106 may detect its current position is a suitable first location 405 for rendering AR POS 420.

In some non-limiting embodiments, customer device 106 may prevent detecting a first location 405 to render AR POS 420 if customer device 106 is not within the merchant location. Alternatively, customer device 106 may permit detecting a first location 405 outside of a merchant location during limited time periods and/or within a limited distance from boundaries of the merchant location (e.g., during a sidewalk sale or pop-up sale at a location separate from the merchant location).

As further shown in FIG. 3, at step 320, process 300 includes superimposing a computer-generated image of AR POS 420 on a view 410 of customer 401 at first location 405. First location 405 may be at least partially within view 410 of customer 401.

In some non-limiting embodiments, customer device 106 may include a camera as an input component 210 and a display as an output component 212. For example, view 410 of customer 401 may be an image captured by the camera, and the computer generated image of AR POS 420 may be superimposed on the image on the display. Alternatively, the display may be a transparent display, view 410 may be what customer 401 can see through the transparent display, and the computer generated image of AR POS 420 may be displayed on the transparent display to thereby appear superimposed on view 410 of customer 401.

As further shown in FIG. 3, at step 330, process 300 includes detecting item data associated with at least one item 440. For example, the item data may be detected in response to item 440 being placed within view 410 of customer 401.

In some non-limiting embodiments, the computer-generated image of AR POS 420 may indicate a second location 415 to place item 440 for purchase. For example, the item data associated with item 440 may be detected by detecting an optical code 445 on item 440 when item 440 is placed in second location 415. Optical code 445 may represent the item data. For example, the item data may be an identifier of item 440. The identifier can be any suitable identifier including, but not limited to, a Universal Product Code (UPC), a merchant-specific product code, a name of the item, and/or the like. Additionally or alternatively, the optical code may be any suitable code including, but not limited to, a barcode (e.g., one-dimensional or two-dimensional bar code), a QR code, and/or the like, as described herein. In some non-limiting embodiments, customer device 106 may include a camera as input component 210, and customer device 106 capture an image of optical code 445 with the camera and detect the item data by identifying optical code 445 in the image (e.g., based on optical code recognition software and/or the like). Additionally or alternatively, the customer device 106 may be configured to detect the item data by identifying item 440 (e.g., based on object recognition software). Additionally or alternatively, item 440 may have text and/or markings thereon, and customer device 106 may be configured to detect the item data by identifying the text and/or markings thereon (e.g., based on character recognition software and/or the like).

In some non-limiting embodiments, the computer generated image of AR POS 420 includes an image of an optical scanner 425. For example, second location 415 may be indicated by an image of an optical beam 427 from optical scanner 425. For purpose of illustration, the image of optical beam 427 can be any suitable shape or representation of an optical beam, including but not limited to a line, a cone, an "x", a square, a series of dots and/or symbols, an image of a laser beam, and/or the like. Additionally or alternatively, the image of optical scanner 425 may be oriented such that when customer 401 aligns optical code 445 of item 440 with the image of scanner 425, optical code 445 will be oriented at an angle suitable for a camera on customer device 106 to detect optical code 445, as described herein. For example, the image of the image of scanner 425 may have a first orientation with respect to view 410 of customer 401, and customer 401 may align optical code 445 of item 440 with the image of scanner 425 so item 440 has a second orientation in which optical code 445 is at a suitable angle for an image thereof to be captured by a camera of customer device 106.

As further shown in FIG. 3, at step 340, process 300 includes transmitting the item data. For example, the item data can be transmitted from the customer device 106 to a merchant system 108. In some non-limiting embodiments, in response to receiving the item data, merchant system 108 can determine a price for the item 440 based on the item data. For example, merchant system 108 can look up/retrieve price data associated with the price of the item 440 from a database. Additionally or alternatively, merchant system 108 can transmit the price data to the customer device 106.

As further shown in FIG. 3, at step 350, process 300 includes receiving the price data associated with the price of the item. For example, merchant system 108 may transmit the price data to customer device 106.

As further shown in FIG. 3, at step 355, in some non-limiting embodiments, the price of item 440 may be displayed on the computer-generated image of AR POS 420. For example, the price may be displayed in response to customer device 106 receiving the price data from merchant system 108. In some non-limiting embodiments, price data may include data associated with a price of item 440, an amount of sales tax of item 440, a total amount of the transaction (e.g., the sum of the price and the sales tax), and/or the like. For example, any combination of the portions of the price data (e.g., price, sale tax, and total amount) may be displayed on the image of AR POS 420. Alternatively, only the total amount may be displayed on the image of AR POS 420.

In some non-limiting embodiments, a plurality of items 440 can be purchased in a single transaction. For example, price data for each item may include data associated with a price of item 440, an amount of sales tax of item 440, a total amount of the transaction, and/or the like. Each time an item 440 is scanned, customer device 106 may determine an item count and may determine a subtotal of the prices of all the items, sales tax for all items, a total amount of the transaction for all items, and/or the like based on the price data for each item. Additionally or alternatively, price data for each item may include data associated with a cumulative item count and/or a cumulative subtotal of the price items that have been scanned, a cumulative sales tax for items that have been scanned, a cumulative total amount of the transaction for items that have been scanned, and/or the like. In some non-limiting embodiments, the image of AR POS 420 may display any combination of the item count, the subtotal of the prices of all the items, sales tax for all items, a total amount of the transaction for all items, and/or the like, all of which may be updated each time a new item is scanned.

In some non-limiting embodiments, if the computer-generated image of AR POS 420 includes an image of a display, the price and/or any other portion of the price data may be displayed on the image of a display.

As further shown in FIG. 3, at step 357, in some non-limiting embodiments, the process 300 may include detecting an input to initiate a payment transaction. For example, customer device 106 may detect and input from customer 401 as described herein before initiating the payment transaction. Alternatively, the payment transaction may be initiated automatically without input from customer 401. For example, the payment transaction may be initiated based on waiting a predetermined period of time after an item 440 is scanned/detected (e.g., by customer device 106). Additionally or alternatively, the payment transaction may be initiated based on the position of customer device 106 (e.g., detect that customer device 106 has a position near an exit of the merchant location).

As further shown in FIG. 3, at step 360, the process 300 may include initiating the payment transaction, which may be based on the price data. In some non-limiting embodiments, customer device 106 may initiate the payment transaction by transmitting account data associated with an account identifier (e.g., of a payment account of customer 401) to merchant system 108. For purpose of illustration, processing of the payment transaction may include merchant system 108 communicating an authorization request to acquirer system 110 associated with an acquirer of the merchant. The authorization request may include data associated with the account identifier of customer 401, the price data, and/or the like. Acquirer system 110 may communicate the authorization request to transaction service provider system 102, which may communicate the authorization request to issuer system 104 associated with an issuer of the payment account of customer 401. Alternatively, acquirer system 110 may communicate the authorization request to issuer system 104. In response to the authorization request, issuer system 104 may communicate an authorization response to transaction service provider 102, which may communicate the authorization response to acquirer system 110. Alternatively, issuer system 104 may communicate the authorization response to acquirer system 110. Acquirer system 110 may communicate the authorization response to merchant system 108. The authorization response may include data indicating whether the payment transaction has been approved or denied.

In some non-limiting embodiments, customer device 106 may initiate the payment transaction by transmitting the account data associated with the account identifier to transaction service provider system 102.

As further shown in FIG. 3, at step 370, in some non-limiting embodiments, process 300 may include receiving authorization data indicating that the payment transaction is complete. For example, merchant system 108 and/or transaction service provider 102 may communicate authorization data to customer device 106 to indicate that the transaction is complete. The authorization data may be any suitable information (e.g., data, signals, messages, instructions, commands, flags, and/or the like) to indicate completion of the transaction. In some non-limiting embodiments, the authorization data may include the authorization response or a portion thereof. Additionally or alternatively, the authorization data may indicate whether the transaction was approved or denied.

As further shown in FIG. 3, at step 375, in some non-limiting embodiments, process 300 may include displaying a message on the computer-generated image of AR POS 420. The message may indicate that the transaction is complete. Additionally or alternatively, the authorization data may indicate whether the transaction was approved or denied. In some non-limiting embodiments, if the computer generated image of AR POS 420 includes an image of a display, the message may be displayed on the image of a display.

As further shown in FIG. 3, at step 377, in some non-limiting embodiments, process 300 may include transmitting a request for assistance from a staff member associated with merchant system 108. For example, customer device 106 may send such a request to merchant system 108. The request may include any suitable information (e.g., data, signals, messages, instructions, commands, flags, and/or the like) to cause merchant system 108 to dispatch a staff member to the position of customer device 106. In some non-limiting embodiments, the request may include position data indicating the position of customer device 106. Additionally or alternatively, the request may include a type of assistance requested, e.g., help bagging/packaging item(s) 440 purchased, help carrying the item(s) 440, help with a technical question regarding AR POS 420, help confirming the price of item(s) 440, help redeeming a discount/coupon/offer, and/or the like.

As further shown in FIG. 3, at step 380, in some non-limiting embodiments, process 300 may include rendering a merchant augmented reality device. For example, the merchant augmented reality device may be rendered by a merchant device of merchant system 108. The merchant augmented reality device may be rendered similarly to AR POS 420 as described herein. Additionally or alternatively, as further shown in FIG. 3, at step 381, rendering the merchant augmented reality device may including detecting a third location for rendering an augmented reality device. For example, detecting the third location (with merchant device 106 of merchant system 108) may be similar to detecting the first location (with customer device 106), as described herein. As further shown in FIG. 3, at step 383, rendering the merchant augmented reality device may include superimposing a computer-generated image of the augmented reality device on a view of a staff member associated with the merchant system at the third location. For example, superimposing the image of the augmented reality device (with merchant device 106 of merchant system 108) may be similar to superimposing the image of AR POS 420 (with customer device 106), as described herein. In some non-limiting embodiments, the third location may be at least partially within the view of the staff member. As further shown in FIG. 3, at step 385, rendering the merchant augmented reality device may include displaying a second message on the computer-generated image of the augmented reality device in response to completion of the payment transaction. For example, displaying the second message on the image of the augmented reality device (with merchant device 106 of merchant system 108) may be similar to displaying the message on the image of AR POS 420 (with customer device 106), as described herein. In some non-limiting embodiments, the second message may indicate that the transaction is complete, approved, and/or denied, as described herein. Additionally or alternatively, the second message may indicate the price of item(s) 440.

In some non-limiting embodiments, a non-transitory computer readable medium may include executable instructions to direct a processor to perform the process 300, or any portion thereof, as described herein.

Figure 5:
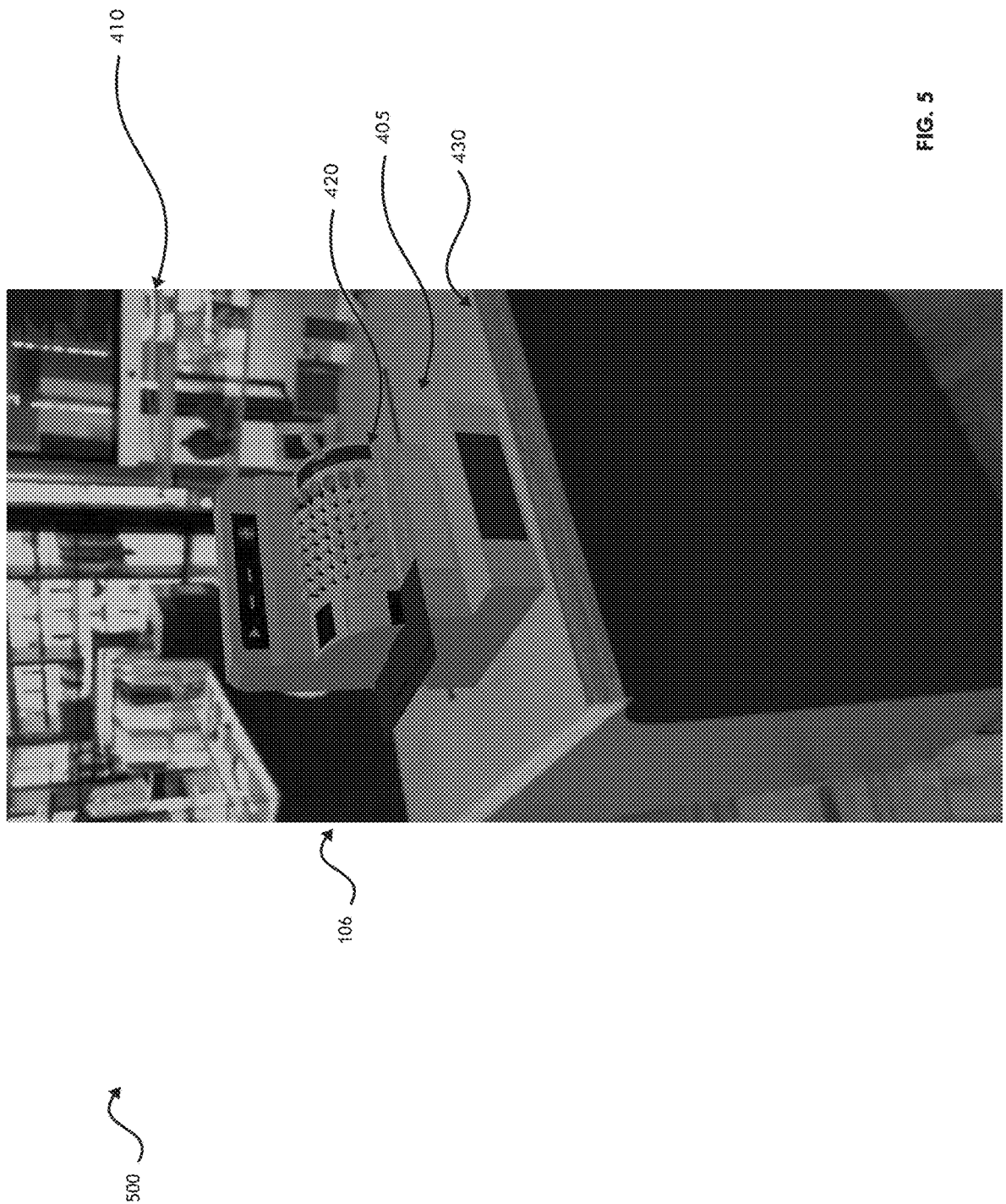
FIG. 5 is an image of a non-limiting embodiment of an implementation of a non-limiting embodiment of the process shown in FIG. 3.

Referring now to FIG. 5, FIG. 5 is an image of a non-limiting embodiment of an exemplary implementation 500 of a non-limiting embodiment relating to process 300 shown in FIG. 3. As shown in FIG. 5, implementation 500 may include an image of an AR POS 420 superimposed on a view 410 of a customer 401, as described herein. For example, as described herein, customer device 106 may detect surface 430 to be a suitable first location 405. First location 405 may be at least partially within view 410, as described herein. Additionally, customer device 106 may superimpose the computer-generated image of AR POS 420 on view 410, as described herein.

Figure 6A:
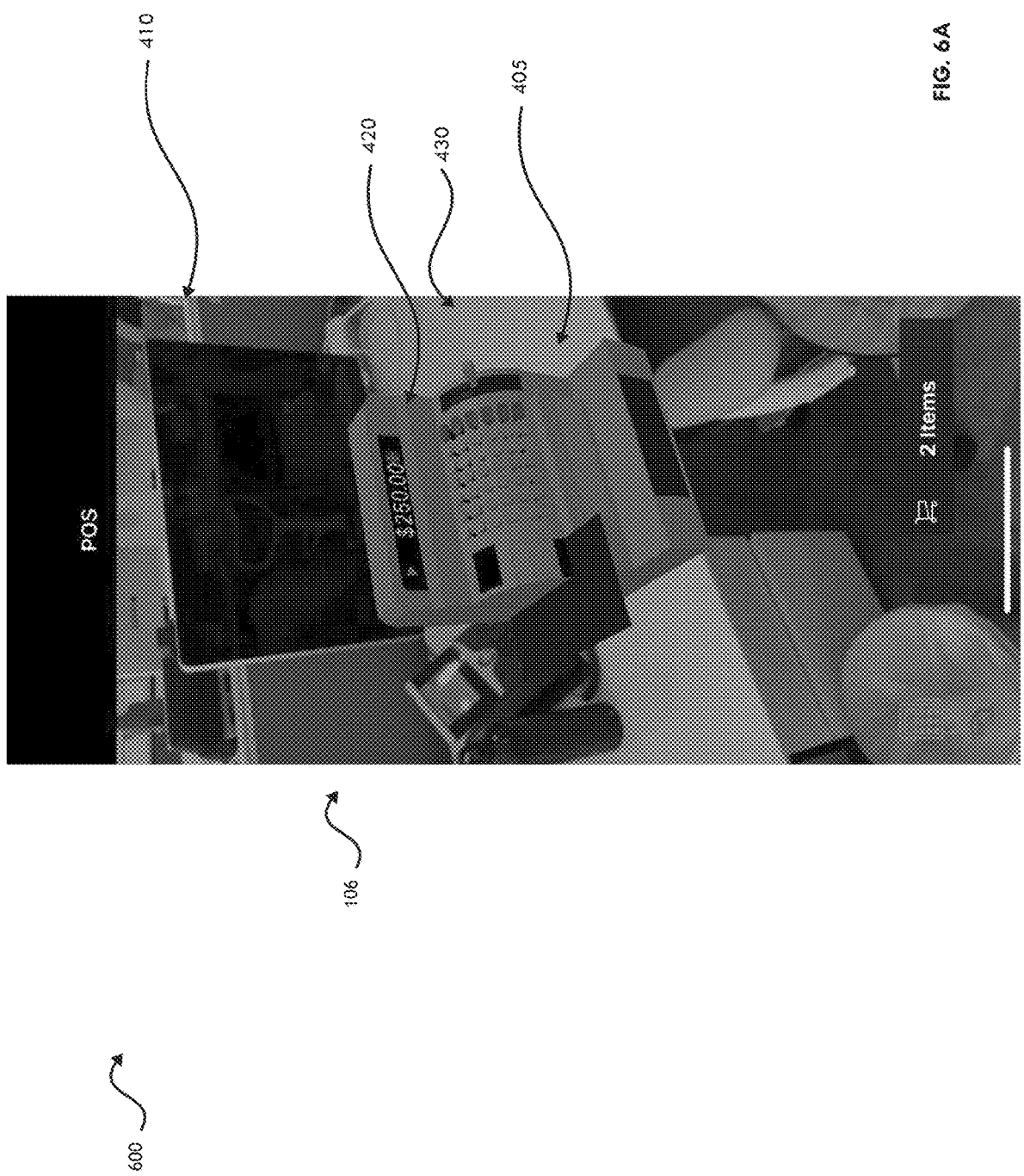
Figure 6B:

Referring now to FIGS. 6A-6C, FIGS. 6A-6C are images of a non-limiting embodiment of an exemplary implementation 600 of a non-limiting embodiment relating to process 300 shown in FIG. 3. As shown in FIG. 6A, implementation 600 may include an image of an AR POS 420 superimposed on a view 410 of a customer 401, as described herein. For example, as described herein, customer device 106 may detect surface 430 to be a suitable first location 405. First location 405 may be at least partially within view 410, as described herein. Additionally, customer device 106 may superimpose the computer-generated image of AR POS 420 on view 410, as described herein.

In some non-limiting embodiments, after receiving price data from merchant system 108, customer device 106 may display a total amount of the transaction (e.g., the combined price of two items 440, which may include applicable sales tax and/or the like) on the computer-generated image of AR POS 420, as described herein. Additionally or alternatively, information associated with the price data (e.g., the price of individual items 440, the number of items 440, an amount of sales tax of individual item(s) 440 of the transaction, and/or the like), may be displayed by customer device 106 within view 410, as described herein.

As shown in FIG. 6B, in some non-limiting embodiments, implementation 600 may include customer device 106 displaying additional information regarding the item(s) 440 (e.g., in response to user input such as selecting the AR POS 420, selecting the area of view 410 identifying a number of item(s) 404 in the transaction, selecting a checkout button in view 410, and/or the like), as described herein. Additional information may include identification of the item(s) 440 (e.g., based on an identifier of item 440), price information based on price data associated with each item 440 (e.g., a price of item 440, an amount of sales tax of item 440, a total amount of the transaction (e.g., the sum of the price and the sales tax), a button to confirm proceeding with checkout, and/or the like.

As shown in FIG. 6C, in some non-limiting embodiments, implementation 600 may include customer device 106 displaying a message within view 410, on the computer-generated image of AR POS 420, and/or the like. In some non-limiting embodiments, the message may indicate that the transaction is complete.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment may be combined with one or more features of any other embodiment.

The invention claimed is:

1. A method for an augmented reality point-of-sale, comprising:
    detecting, with at least one processor associated with a customer device of a customer, a first location for rendering an augmented reality point-of-sale;
    superimposing, with the at least one processor, a computer-generated image of the augmented reality point-of-sale on a view of the customer at the first location, the first location at least partially within the view of the customer, the computer-generated image of the augmented reality point-of-sale comprising an image of a scanner and an image of an optical beam from the scanner, the image of the optical beam from the scanner indicating a second location to place an item for purchase;

in response to the item being placed within the view of the customer, detecting, with the at least one processor, item data associated with the item;

transmitting, with the at least one processor, the item data to a merchant system;

receiving, with the at least one processor, price data associated with a price of the item; and initiating, with the at least one processor, a payment transaction based on the price data.

2. The method of claim 1, wherein detecting the first location comprises detecting a surface on which to render the augmented reality point-of-sale.

3. The method of claim 1, wherein the first location is a predefined location within a merchant location, and wherein detecting the first location comprises:
   detecting, with the at least one processor, a position of the customer device; and
   determining, with the at least one processor, that the customer device is within the predefined location.

4. The method of claim 1, wherein detecting the first location comprises:
   detecting, with the at least one processor, a position of the customer device; and
   determining, with the at least one processor, that the customer device is not within a restricted location.

5. The method of claim 1, wherein the customer device comprises a camera and a display, and further wherein the view of the customer comprises an image captured by the camera and displayed on the display.

6. The method of claim 1, wherein detecting the item data associated with the item comprises detecting an optical code on the item, the optical code representing the item data.

7. The method of claim 1, wherein initiating the payment transaction comprises transmitting, with the at least one processor, account data associated with an account identifier to the merchant system.

8. The method of claim 1, wherein initiating the payment transaction comprises transmitting, with the at least one processor, account data associated with an account identifier and price data to a transaction handler.

9. The method of claim 1, further comprising detecting, with the at least one processor, an input from the customer before detecting the first location for rendering the augmented reality point-of-sale.

10. The method of claim 1, further comprising, in response to receiving the price data, displaying, with the at least one processor, the price of the item on the computer-generated image of the augmented reality point-of-sale.

11. The method of claim 1, further comprising detecting, with the at least one processor, an input from the customer before initiating the payment transaction.

12. The method of claim 1, further comprising:
   receiving, with the at least one processor, authorization data indicating that the payment transaction is complete; and
   displaying, with the at least one processor, a message on the computer-generated image of the augmented reality point-of-sale, wherein the message indicates that the transaction is complete.

13. The method of claim 1, further comprising, transmitting, with the at least one processor, a request for assistance from a staff member associated with the merchant system.

14. The method of claim 1, further comprising:
   detecting, with at least one second processor associated with a merchant device of the merchant system, a third location for rendering an augmented reality device;
   superimposing, with the at least one second processor, a computer-generated image of the augmented reality device on a view of a staff member associated with the merchant system at the third location, wherein the third location is at least partially within the view of the staff member; and
   in response to completion of the payment transaction, displaying, with the at least one second processor, a second message on the computer-generated image of the augmented reality device, wherein the message indicates that the transaction is complete.

15. The method of claim 14, wherein the second message further indicates the price of the item.

16. A system for an augmented reality point-of-sale, comprising:
   a merchant system at a merchant location; and
   a customer device associated with a customer at the merchant location, the customer device in communication with the merchant system, the customer device comprising a processor and a non-transitory computer readable medium comprising executable instructions to direct the processor to:
      detect a first location within the merchant location for rendering an augmented reality point-of-sale;
      superimpose a computer-generated image of the augmented reality point-of-sale on a view of a customer at the first location, the first location at least partially within the view of the customer, the computer-generated image of the augmented reality point-of-sale comprising an image of a scanner and an image of an optical beam from the scanner, the image of the optical beam from the scanner indicating a second location to place an item for purchase;
      in response to the item being placed within the view of the customer, detect item data associated with the item;
      transmit the item data to a merchant system;
      receive price data associated with a price of the item; and
      initiate a payment transaction based on the price data.

17. The system of claim 16, further comprising:
   a network in communication with the merchant system and the customer device;
   an acquirer system in communication with the network;
   a transaction service provider in communication with the network; and
   an issuer system in communication with the network.

18. A computer program product for an augmented reality point-of-sale, the computer program product comprising at least one non-transitory computer-readable medium including one or more instructions that, when executed by at least one processor, cause the at least one processor to:
   detect a first location for rendering an augmented reality point-of-sale;
   superimpose a computer-generated image of the augmented reality point-of-sale on a view of a customer at the first location, the first location at least partially within the view of the customer, the computer-generated image of the augmented reality point-of-sale comprising an image of a scanner and an image of an optical beam from the scanner, the image of the optical beam from the scanner indicating a second location to place an item for purchase;
in response to the item being placed within the view of the customer, detect item data associated with the item;
transmit the item data to a merchant system;
receive price data associated with a price of the item; and
initiate a payment transaction based on the price data.

* * * * *